(12) United States Patent
Topiwalla

(10) Patent No.: US 11,750,880 B2
(45) Date of Patent: *Sep. 5, 2023

(54) PREPARING MOBILE MEDIA CONTENT

(71) Applicant: DISH Network L.L.C., Englewood, CO (US)

(72) Inventor: Sanjiv Topiwalla, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,334

(22) Filed: Apr. 21, 2022

(65) Prior Publication Data

US 2022/0248086 A1    Aug. 4, 2022

Related U.S. Application Data

(63) Continuation of application No. 16/990,999, filed on Aug. 11, 2020, now Pat. No. 11,330,330, which is a continuation of application No. 15/872,125, filed on Jan. 16, 2018, now Pat. No. 10,764,633.

(51) Int. Cl.
| | |
|---|---|
| *H04N 21/4402* | (2011.01) |
| *H04N 21/482* | (2011.01) |
| *H04N 21/475* | (2011.01) |
| *H04N 21/433* | (2011.01) |

(52) U.S. Cl.
CPC . *H04N 21/440218* (2013.01); *H04N 21/4334* (2013.01); *H04N 21/4753* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 8,495,237 B1 | 7/2013 | Bilinski et al. | |
| 8,655,970 B1* | 2/2014 | Cohen | G06Q 30/00 455/412.2 |
| 9,232,174 B1 | 1/2016 | Kotab | |
| 9,648,088 B1* | 5/2017 | Pande | G06Q 30/0252 |
| 10,764,633 B2 | 9/2020 | Topiwalla | |
| 2003/0233663 A1 | 12/2003 | Rao et al. | |
| 2004/0237104 A1 | 11/2004 | Cooper et al. | |
| 2005/0108069 A1* | 5/2005 | Shiran | G06Q 10/02 705/5 |
| 2007/0124775 A1 | 5/2007 | DaCosta | |
| 2008/0167887 A1* | 7/2008 | Marcken | G06Q 10/02 705/5 |
| 2008/0229375 A1 | 9/2008 | Roberts et al. | |
| 2008/0270686 A1 | 10/2008 | Grannan | |

(Continued)

*Primary Examiner* — Alexander Q Huerta
(74) *Attorney, Agent, or Firm* — Perkins Coie LLP

(57) ABSTRACT

A mobile device includes a processor and a memory. The memory stores instructions executable by the processor such that the processor is programmed to identify, based on user data a reference time. The processor is further programmed to send, via a human-machine interface included in the mobile device, a message to a user to input a user request to download a media content item prior to the reference time. The processor is further programmed to receive the user request to download the media content item and download the media content item from a media device.

13 Claims, 6 Drawing Sheets

(56) References Cited

U.S. PATENT DOCUMENTS

| | | | |
|---|---|---|---|
| 2009/0203388 A1* | 8/2009 | Karaoguz | H04W 4/18 |
| | | | 455/456.3 |
| 2009/0285391 A1 | 11/2009 | Johnson et al. | |
| 2010/0146560 A1 | 6/2010 | Bonfrer | |
| 2010/0281042 A1 | 11/2010 | Windes et al. | |
| 2013/0253833 A1* | 9/2013 | Tuukkanen | G06F 3/04847 |
| | | | 701/538 |
| 2013/0344896 A1* | 12/2013 | Kirmse | G06F 16/9537 |
| | | | 455/456.3 |
| 2014/0095943 A1 | 4/2014 | Kohlenberg et al. | |
| 2014/0250468 A1 | 9/2014 | Barr et al. | |
| 2015/0161285 A1* | 6/2015 | Fiatal | G06F 16/9574 |
| | | | 707/722 |
| 2015/0207691 A1 | 7/2015 | Price | |
| 2016/0041993 A1* | 2/2016 | Maynard | G06F 16/116 |
| | | | 707/809 |
| 2018/0077261 A1 | 3/2018 | Johansson | |
| 2019/0065969 A1* | 2/2019 | Shaw | H04N 21/4516 |
| 2019/0342419 A1* | 11/2019 | Bromand | H04N 21/41422 |
| 2020/0374583 A1 | 11/2020 | Topiwalla | |
| 2023/0013876 A1* | 1/2023 | Channapragada | |
| | | | H04N 21/4335 |

* cited by examiner

PREPARING MOBILE MEDIA CONTENT

CROSS-REFERENCE TO RELATED APPLICATIONS

This application is a continuation of U.S. patent application Ser. No. 16/990,999, filed on Aug. 11, 2020, entitled "PREPARING MOBILE MEDIA CONTENT," now U.S. Pat. No. 11,330,330, issued on May 10, 2022, which is a continuation of U.S. patent application Ser. No. 15/872,125 filed on Jan. 16, 2018, entitled "PREPARING MOBILE MEDIA CONTENT," now U.S. Pat. No. 10,764,633 issued on Sep. 1, 2020, which is incorporated herein in its entirety by reference for all purposes.

BACKGROUND

Some locations lack access to networks such as the Internet. Users in these locations may not be able to stream media content to their mobile devices. Present media delivery systems are lacking with respect to providing content to disconnected users. A further problem is that content may not be in a format suitable for a mobile device.

DRAWINGS

DETAILED DESCRIPTION

Example System

Figure 1:
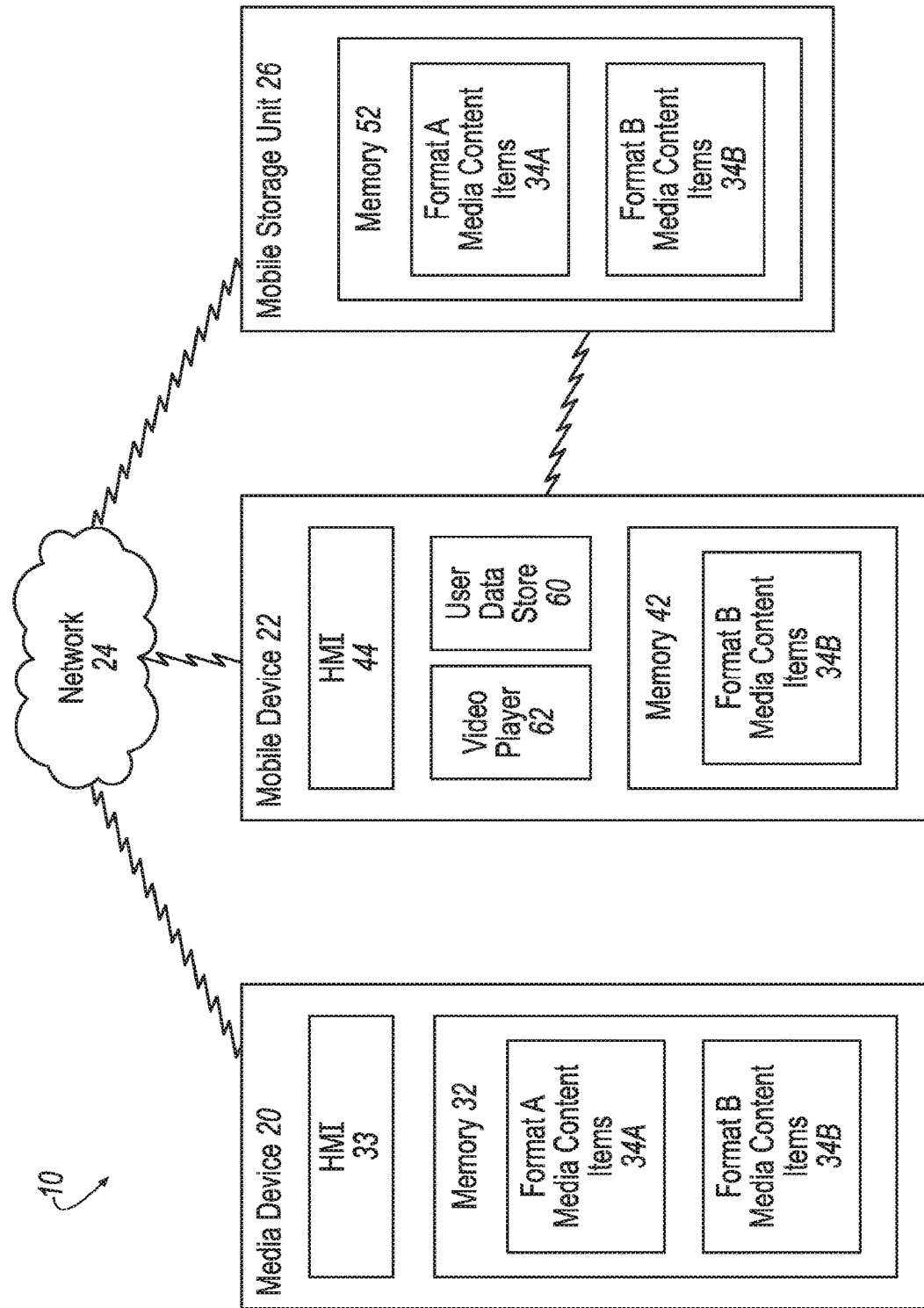
FIG. 1 is a diagram of an exemplary media system for preparing and transferring media content from a media device to a remote device.

An example mobile device includes a processor and a memory, the memory storing instructions executable by the processor. The processor is programmed to identify, based on user data, a reference time. The processor is further programmed to receive a user request to download a media content item prior to the reference time, and download the media content item from a media device.

In another example, identifying the reference time can include programming to determine that the processor is authorized to access a user data store on the mobile device, and identify the reference time based on data included in the user data store.

In another example, the processor can be further programmed to determine that the reference time is within a predetermined time period, and send, via a human-machine interface included in the mobile device, a message to the user to input the user request to download the media content item.

In another example, the processor can be further programmed to request from the media device a list of available media content items, and send, via the human-machine interface, the list of available media content items.

In another example, the processor can be further programmed to receive an input from the user via the human-machine interface selecting the media content item from the list of available media content items.

In another example, the processor can be further programmed to display the media content item.

In another example, the processor can be further programmed to enable the media device to transcode the media content item based on a determination that the identified reference time is within a predetermined time period.

In another example, the processor can be further programmed to send to the media device a message including a time to initiate the transcoding of the media content item. The processor can be further programmed to determine the time based on the reference time. The processor can still further be programmed to request from the media device a list of media content items available for transcoding, and send, via the human-machine interface, the list of available media content items.

In an example, the list of media content items available for transcoding includes a media content item scheduled for recording after receiving the message, and before the time to initiate the transcoding.

In another example, the processor can be further programmed to determine that the processor is authorized to download a media content item, determine that the reference time is within a predetermined time period, and download the media content item based on a determination that the processor is authorized to download the media content item, and further based on a determination that the reference time is within a predetermined time period.

An example system includes a mobile device including a processor and a memory, the memory storing instructions executable by the processor such that the processor is programmed to identify, based on user data a reference time. The processor is further programmed to enable a media device to transcode a media content item based on a determination that the identified reference time is within a predetermined time period. The example system further includes the media device including a second processor and a second memory, the second memory storing second instructions executable by the second processor such that the second processor is programmed to transcode the media content item.

In another example, the processor can be programmed to send to the media device a message including a time to initiate the transcoding of the media content item. The second processor can be further programmed to record the media content item after receiving the message and before the time and transcode the media content item.

An example method includes identifying, based on user data a reference time. The example process further includes receiving a user request to download a media content item prior to the reference time, and downloading the media content item from a media device.

In another example, the method can further include determining that the processor is authorized to access a user data store on the mobile device, and identifying the reference time based on data included in the user data store.

In another example, the process can further include determining that the reference time is within a predetermined time period, and sending, via a human-machine interface included in the mobile device, a message to the user to input the user request to download the media content item.

In another example, the process can further include requesting from the media device a list of available media content items, and sending, via the human-machine interface, the list of available media content items.

In another example, the process can further include receiving an input from the user via the human-machine interface selecting the media content item from the list of available media content items.

In another example, the process can further include enabling the media device to transcode the media content item based on a determination that the identified reference time is within a predetermined time period.

Further disclosed is a processor and a memory, the memory storing instructions executable by the processor to execute any one of the above method steps. Yet further disclosed is a mobile device including a processor and the memory.

As illustrated in FIG. 1, a mobile device 22 may include a user data store 60 that includes user data. The mobile device 22 is programmed to access the user data store 60, determine, based on data included in the user data store 60, a reference time 70, i.e., a moment in time specified for downloaded media content to be available on the user's mobile device 22, and message the user to download media content prior to the reference time 70. For example, the reference time 70 may be a time when the user intends to travel and/or intends to be in a location without network access. A timeline illustrating the reference time 70 and other related timing indicators appears in FIG. 2. The mobile device 22 may further be programmed to communicate with a user media device 20 such as a set-top box or DVR. Based on data maintained on the media device 20, the mobile device 22 may identify media content items available for downloading and present a list of the available media content items 34 to the user. Based on the list, the user may select media content that the user would like to download from the media device 20 to the mobile device 22.

The mobile device 22 may further be programmed to enable transcoding of media content items on the media device 20. The mobile device 22 may still further be programmed to initiate the download of media content items from the media device 20 to the mobile device 22 prior to the reference time 70.

An exemplary computer system 10 includes the media device 20, the mobile device 22, and a network 24. The media device 20 and mobile device 22 are communicatively coupled via the network 24. Communicatively coupled, in the context of this disclosure, means being able to exchange digital data and digital instructions via wired and/or wireless communications. The system 10 may further include a mobile storage unit 26. The mobile storage unit 26 may also be communicatively coupled with the media device 20 and/or mobile device 22 via the network 24.

The media device 20 receives and displays media content, and includes a computing device including one or more processors and one or more memories 32. The media device 20 may further include a human-machine interface (HMI) 33. Non-limiting examples of the media device 20 include a set-top box, a laptop, desktop, tablet computer, game box, a television, etc. The media device 20 is programmed to perform conventional media device operations such as receiving and displaying media content. For example, the media device 20 is programmed to receive and record media content items 34 based on user input. Media content items 34 include format A media content items 34A that are formatted for display by the media device 20 and format B media content items that are formatted for display by the mobile device 22. A data format is a specification for storage of video and/or audio data, e.g., according to MPEG or some other standard for organizing and compressing video and/or audio data. For example, the resolution of the format B media content item 34B may be reduced relative to the format A media content item 34A to reduce the number of pixels required in order to be compatible with the display on the mobile device 22.

The media device 20 transcodes the format A media content item 34A to the format B media content item 34B to meet performance, display resolutions, aspect ratios, memory space limitations, specific language preferences etc., of the mobile device 22. In some cases, transcoding from the format A media content item 34A to the format B media content item 34B may include transcoding from a first format type such as MPEG 1 or 2, to a second format type, such as MPEG 4. In other cases, both the format A media content item 34A and the format B media content item 34B may be the same format type (e.g., MPEG 1, MPEG 2, MPEG 4), but characteristics such as display resolutions, aspect ratios, etc. are changed within the format to accommodate the mobile device 22.

The user may, e.g. via the HMI 33, input a request to the media device 20 to regularly record a media content item 34, e.g., a 6:30 News Report. Based on the input, the media device 20 may receive and store media content item 34, e.g., the 6:30 News Report as a format A media content item 34A in the memory 32 each evening. The media device 20 may further be programmed to transcode format A media content items 34A to format B media content items 34B. The user may further, e.g., via the HMI 33, pre-select current or future transfers of media content items 34 to the mobile device 22 or mobile storage unit 26.

As described in additional detail below, the media device 20 may further be programmed to receive instructions from the mobile device 22 and perform operations on the format A media content items 34A and format B media content items 34B. As a first example, the media device 20 may initiate a transcoding of a format A media content item 34A to a format B media content item based on instructions received from the mobile device 22. As another example, the media device 20 may transmit a format B media content item 34B to the mobile device 22 based on instructions received from the mobile device 22.

In some cases, the media device 20 may receive an instruction from the mobile device 22 to perform an operation at a reference time 70. For example, the mobile device 22 may send an instruction to the media device 20 to transcode all (or selected) format A media content items 34A that are recorded following receipt of the instruction and before the reference time 70 to format B media content items 34B. In this manner, the media device 20 can prepare the most recently recorded format A media content items 34A for viewing on the mobile device 22 that are available prior to the reference time 70.

The mobile device 22 may be a conventional portable computing device such as a mobile telephone or tablet, and includes one or more processors, one or more memories 42 and a human-machine interface (HMI) 44. The processors are communicatively coupled to the memory 42 and HMI 44.

The mobile device 22 includes one or more user applications including a user data store 60 and a video player 62. The user data store 60, video player 62 and other applications may include instructions stored in memory such as the memory 42. The user data store 60 may be one or more applications that include data related to the user, such as a calendar or email account. The user data store 60 could include, for example, a data store for a calendar application such as the calendar application in OUTLOOK from MICROSOFT® CORPORATION with headquarters in Redmond, Wash. An example of the video player 62 is DISH Anywhere® from DISH NETWORK L.L.C., with headquarters in Englewood, Colo.

The mobile device 22 is programmed, pending authorization from the user, to access the user data store 60, and determine a reference time 70 for a prior download of media content items 34 to the mobile device 22. For example, the mobile device 22 may identify keywords in the data indicating an upcoming trip, or keywords indicating that the user will be at a location that does not have network access, etc. The programming to access the user data store 60 may be included, for example, in the video player 62. The mobile device 22 may access data in the user data store 60 and, based on the data, determine a reference time 70 prior to which a download is to be completed.

Based on the reference time 70, the mobile device 22 may initiate one or more operations. For example, a first predetermined time period 72 before the reference time 70, the mobile device 22 may message the user, e.g., via the HMI 44, to download media content items from the media device 20. The first predetermined time period 72 is a time to remind the user to download media content items 34 prior to an impending reference time 70. The message to the user may include a list of available media content items 34 for downloading.

As another example, a second predetermined time period 74 before the reference time 70, the mobile device 22 may send an instruction to the media device 20, to transcode or to schedule the transcoding of one or more format A media content items 34A to format B media content items 34B. The second predetermined time period 74 is a time to prepare media content items 34 for downloading prior to the reference time 70. As another example, a third predetermined time period 76 before the reference time 70, the mobile device 22 may request that the media device 20 transmit the one or more media content items 34 (e.g., format B media content items 34B) to the mobile device 22. The third predetermined time period 76 may be a time to download media content items before the reference time 70.

The mobile device 22 may further be programmed to perform operations based on user input. For example, the video player 62 may be activated upon receipt of a user input via the HMI 44. Via a graphical user interface (GUI), the user may request a list of media content items 34 available for downloading.

Based on the request, the mobile device 22 is programmed to send a request to the media device 20, requesting a list of media content items 34 that have been recorded and/or will be recorded in a specified time. The mobile device 22 may further receive the list of the media content items 34 from the media device 20.

Based on the list from the media device 20, the mobile device 22 may present a graphical user interface (GUI) to the user including the list of media content items available for downloading. The user may select media content items for downloading by selecting, e.g., via a touchscreen, the media content items in the list. The mobile device 22 may then send a request to the media device 20 to transcode, and/or download the selected media content items 34 to the mobile device 22. The term "media content" as used herein, refers to audio and/or video data, e.g., in a format such as described below.

The media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to the media device 20, the mobile device 22 and/or the mobile storage unit 26 in a format such as the MPEG-1, MPEG-2 or the H.264/MPEG-4 Advanced Video Coding standards (AVC) (H.264 and MPEG-4 at present being consistent) and HEVC/H.265. As is known, MPEG and H.264 data include metadata, audio, and video components. Further, media content and advertisement content in the computer system 10 could alternatively or additionally be provided according to some other standard or standards. For example, media content and advertisement content could be audio data formatted according to standards such as MPEG-2 Audio Layer III (MP3), Advanced Audio Coding (AAC), etc.

The network 24 represents one or more mechanisms for providing communications, including the transfer of media content items 34, between the media device 20, the mobile device 22 and the mobile storage unit 26. Accordingly, the network 24 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, Bluetooth®, near-field communication (NFC), etc.

The mobile storage unit 26 is a conventional device to store and transport media content items and includes one or more processors and a memory 52. The mobile storage unit 26 may be programmed to download media content items 34 from the media device 20 and store the media content items 34 in the memory 52. The mobile storage unit 26 may, for example, be programmed to synchronize, i.e., form a radio frequency communications link with the media device 20 and download media content items 34. Alternatively or additionally the mobile storage unit 26 may be programmed to download the media content items 34 based on input from the user, or based on a message received from the mobile device 22 or from the media device 20.

The mobile storage unit 26 can be communicatively coupled to the mobile device 22 such that the media content items 34 stored on the mobile storage unit 26 can be played (displayed) on the mobile device 22. For example, the mobile storage unit 26 may be programmed to communicate with the mobile device 22 via a Wi-Fi® connection, or any other wired or wireless connection.

Figure 2:
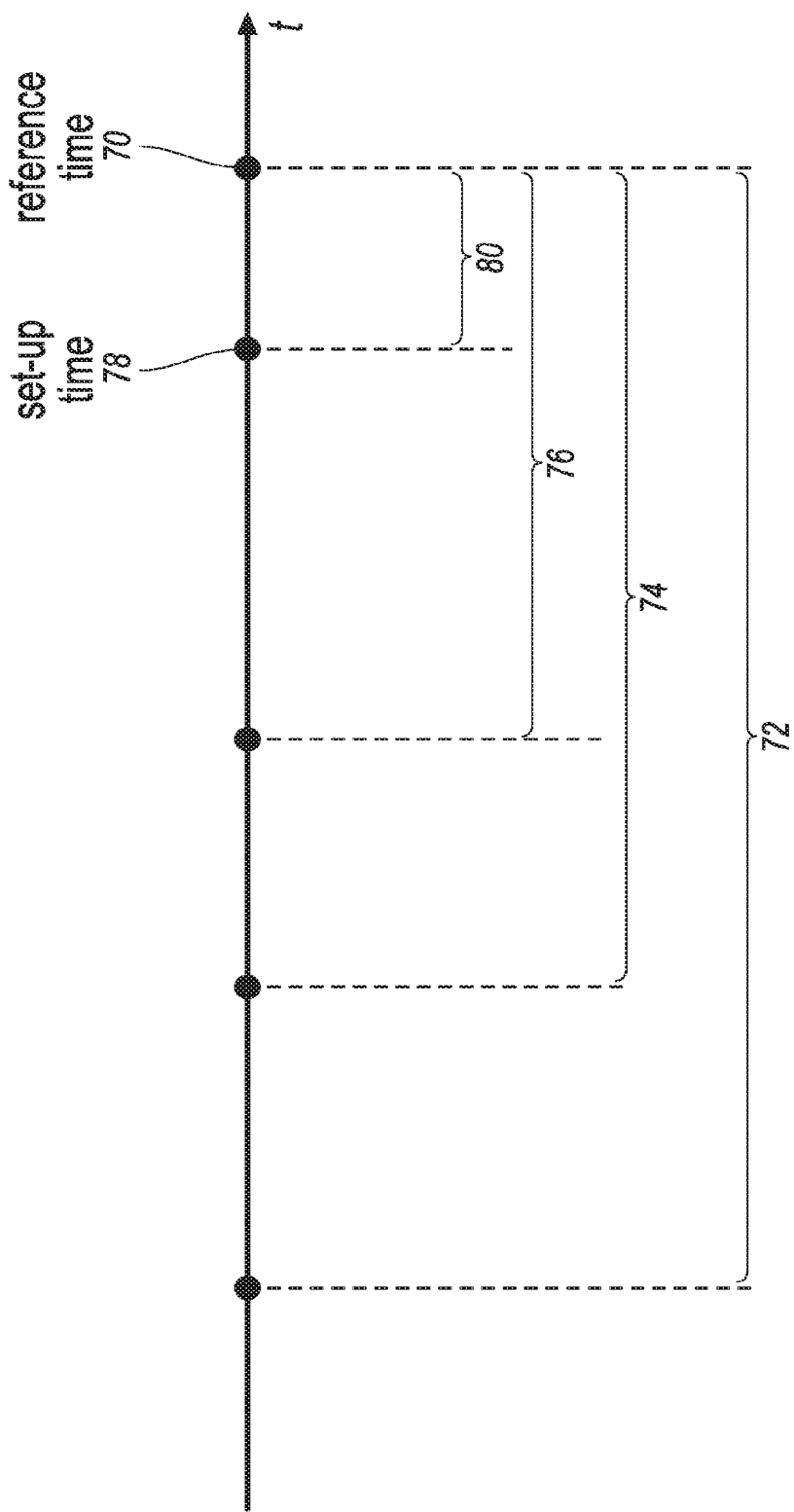
FIG. 2 is an exemplary time line for processing media content data.

FIG. 2 is an exemplary time line illustrating a reference time 70, first, second and third predetermined time periods 72, 74, 76, a set-up time 78 and a buffer period 80. As described above, the reference time 70 is a time that may be specified for downloaded media content to be available on the user's mobile device 22. The first predetermined time period 72 is a time to remind the user to download media content items 34 prior to an impending reference time 70. The second predetermined time period 74 is a time to prepare media content items 34 for downloading prior to the reference time 70. The third predetermined time period 76 is a time to download media content items 34 before the reference time 70.

The set-up time 78 and buffer period 80 relate to the timing of transcoding data by the media device 20 as discussed in the process 500 below. The buffer period 80 is a time period, prior to the reference time 70, when transcoding of format A media content items 34A to format B media content items 34B is to be initiated. The set-up time 78 is the reference time 70 minus the buffer period 80.

The time line shown in FIG. 2 is only an example. The lengths of the first, second and third predetermined time periods 72, 74, 76 are independent of each other. All of the first, second and third predetermined time periods 72, 74, 76 may be the same. Alternatively, any one of the first, second and third predetermines time periods 72, 74, 76 may be shorter or longer than any one of the other first, second and third predetermined time periods 72, 74, 76.

Example Processes

Figure 3:
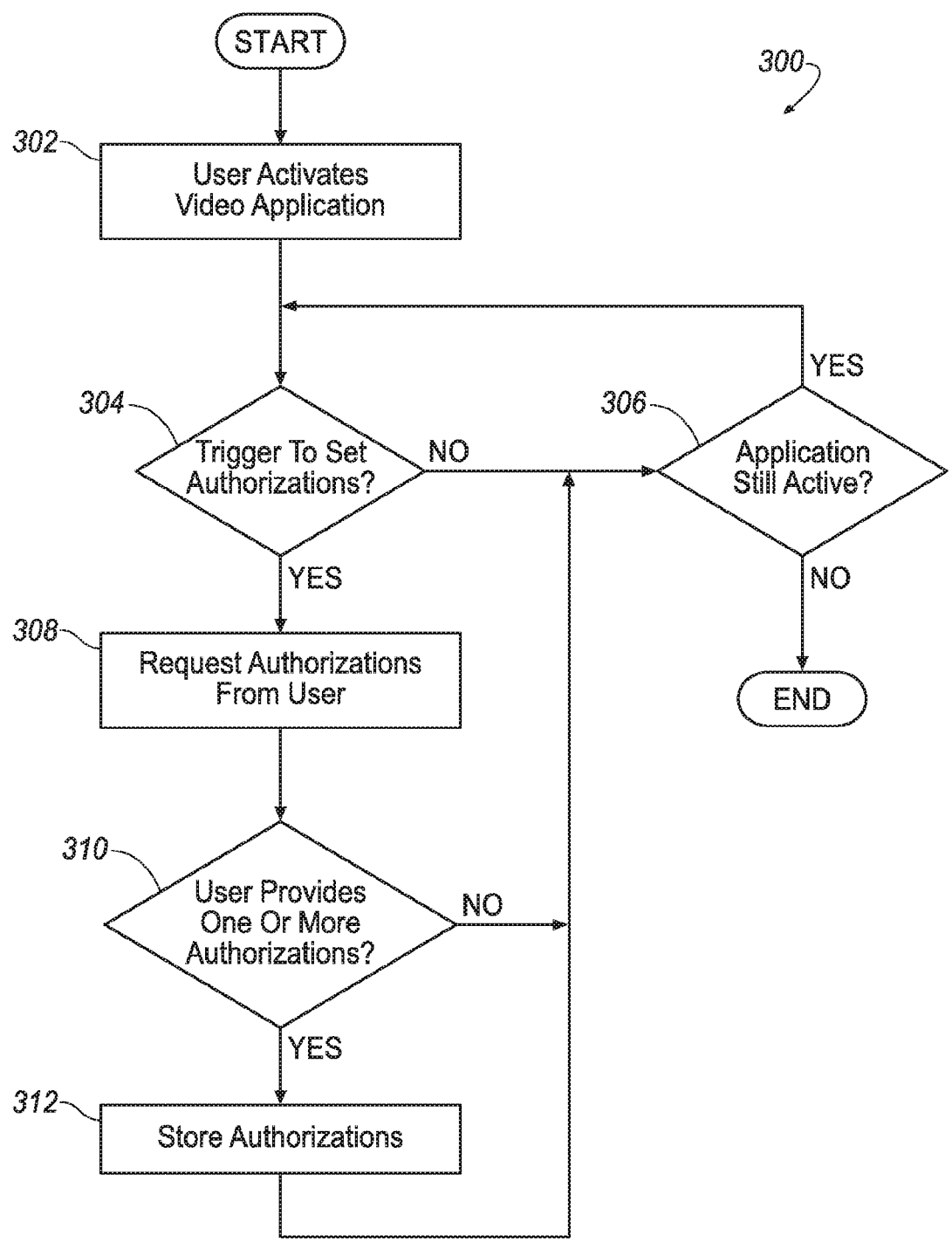
FIG. 3 is a diagram of an exemplary process for authorizing a video player on a mobile device to access a user data.

FIG. 3 is a diagram of an exemplary process 300 for authorizing a video player 62 on a mobile device 22 to access the user data store 60, notify the user and/or prepare media content prior to a reference time 70. The process 300 starts in a block 302.

In the block 302 the user activates the video player 62 in the mobile device 22. The process 300 continues in a block 304.

In the block 304, the mobile device 22 in the mobile device 22 determines whether a trigger has occurred to set authorizations for the video player 62. The trigger is an event such as input received by the mobile device 22, or a time of day to which the video player 62 is programmed to respond by initiating a process to set authorizations. The trigger may be, for example, a step in an installation process for installing the video player 62. Alternatively, the trigger event may be an input from the user requesting to set up authorizations for the video player 62. The input from the user may be via a GUI presented to the user by the video player 62. In the case that the mobile device 22 does not identify a trigger event, the process 300 continues in a block 306. Otherwise, the process continues in a block 308.

In the block 306, the mobile device 22 determines whether the video player 62 is still active. Active, in this context, means that the video player 62 continues to provide output to the HMI 44 and/or continues to receive input from the HMI 44. In the case that the video player 62 is still active, the process 300 continues in the block 304. Otherwise, the process 300 ends.

In the block 308, which follows the block 304, the mobile device 22 requests authorizations from the user. The mobile device 22, based, for example, on programming included in the video player 62, may present a GUI to the user via the HMI 44. The GUI may include a list of possible authorizations for the video player 62. The list may include, for example:
(1) Authorization to collect data from the user data store 60;
(2) Authorization to notify the user an upcoming reference time 70 within a first predetermined time period 72;
(3) Authorization to enable transcoding of media content items by the media device 20 within a second predetermined time period 74 of the reference time 70; and/or
(4) Authorization to download media content from the media device 20 within a third predetermined time period 76 of the reference time 70.

Additionally, the mobile device 22 may request that the user choose times for the first, second and third predetermined time periods 72, 74, 76. For example, with regard to the first predetermined time period 72, the mobile device 22 may provide a set of options, such as (a) one day, (b) two days, (c) three days. The user may select the first predetermined time period 72 from the set of options. The mobile device 22 may similarly provide sets of options for each of the second predetermined time period 74 and third predetermined time period 76.

The user may also select a buffer period 80. The buffer period 80 is a time period, prior to a reference time 70, when transcoding of format A media content items 34A to format B media content items 34B is to be initiated prior to the reference time 70. In some cases, for example, the media device 20 may be programmed to continue to record media content items 34 until a buffer period 80 before the reference time 70, and then begin transcoding.

Still further, the mobile device 22 may request that the user identify media content items 34 to be processed. For example, the mobile device 22 may request a list from the media device 20 of media content items that have been recorded, but not yet consumed. Additionally or alternatively, the mobile device 22 may request a list from the media device 20 of media content items 34 that are scheduled to be recorded between now and a fourth predetermined time. The fourth predetermined time may be a time that ends before the reference time 70.

The mobile device 22 may present the list of media content items 34 to the user, and the user may select the media content items 34 that the user would like to have transcoded and/or downloaded to the mobile device 22. The process 300 continues in a block 310.

In the block 310, the mobile device 22 determines whether the user provided one or more authorizations and/or additional inputs to the video player 62. In the case that the user provided inputs to the video player 62, the process 300 continues in a block 312. Otherwise, the process 300 continues in the block 306.

In the block 312, the mobile device 22 stores the inputs from the user. For example, the mobile device 22 stores a list of one or more operations that user authorized. The mobile device 22 further stores inputs from the user specifying the first, second and third predetermined time periods 72, 74, 76. The mobile device 22 further stores inputs from the user indicating media content items 34 the user selected for operations such as transcoding and downloading. The process 300 continues in the block 306.

Figure 4A:
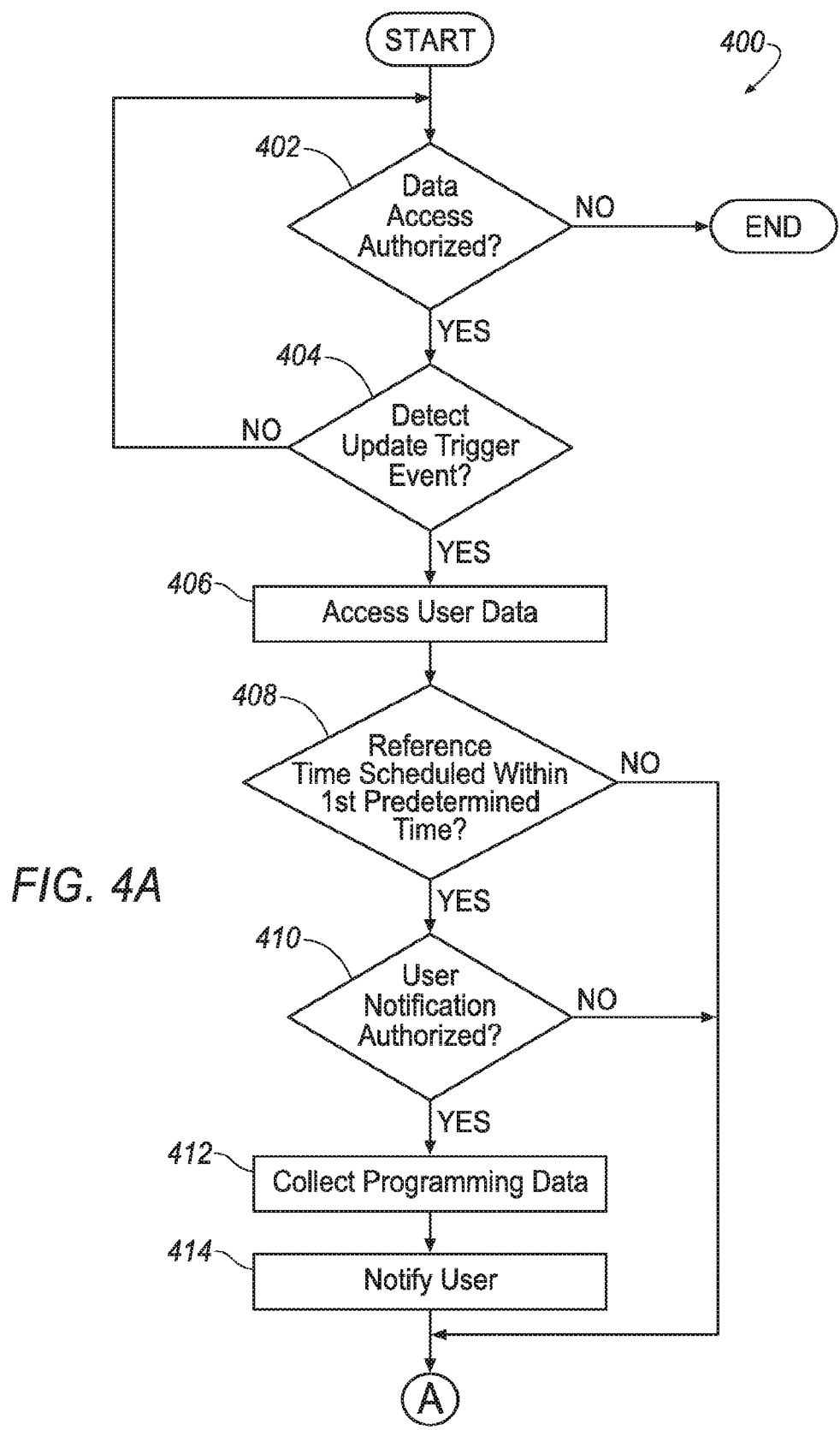
FIGS. 4A and 4B are a diagram of an exemplary process for processing user data.
Figure 4B:
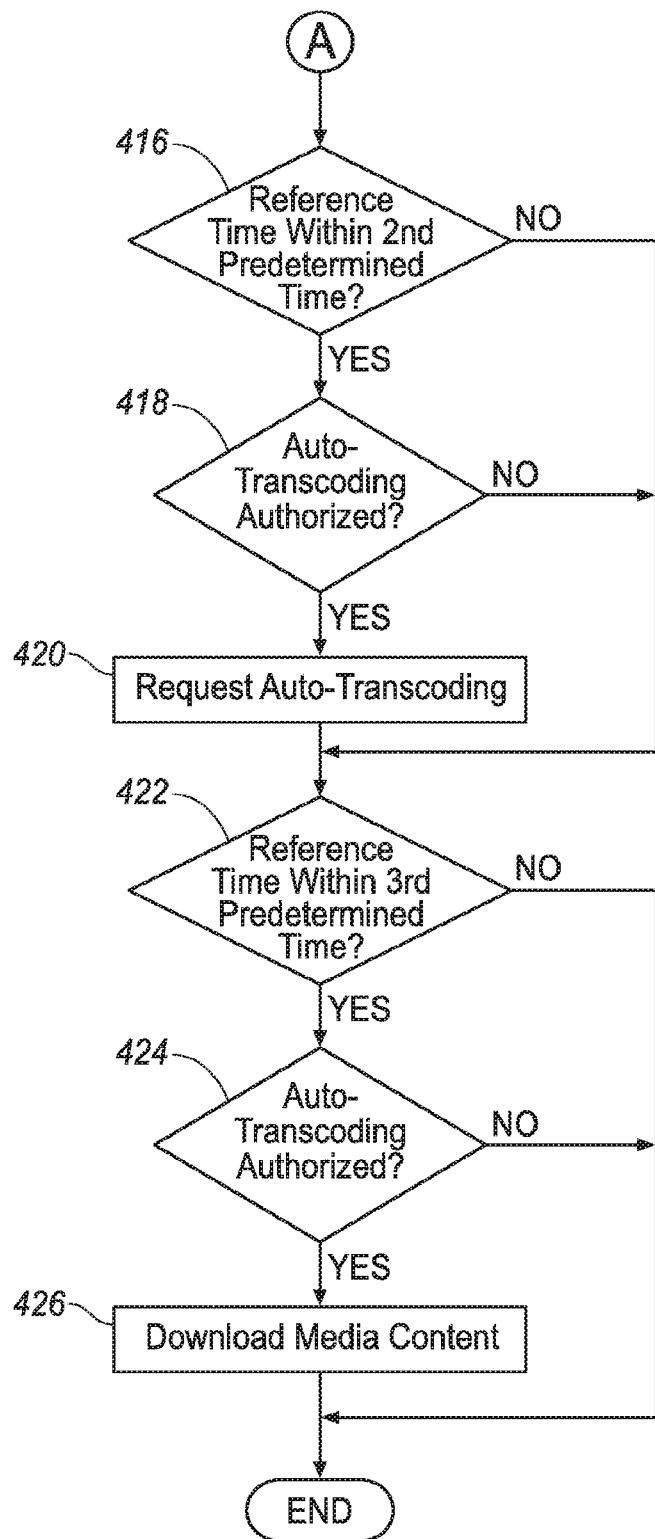

FIGS. 4A and 4B are a diagram of an exemplary process 400 for processing data prior to a reference time 70. The process 400 beings in a block 402.

In the block 402, the mobile device 22 determines whether the user has authorized access to the user data store 60. For example, the user may have authorized access to the user data store 60 as described referencing the process 300 above. In the case that the user has authorized access to the user data store 60, the process 400 continues in a block 404. Otherwise, the process 400 ends.

In the block 404, the mobile device 22 detects a trigger to check the user data store 60 and prepare media content items 34 for the reference time 70. The trigger may be, for example a time of day. The mobile device 22 may be programmed to review the data store 60 once per day, for example, at 7:00 pm. As another example, the trigger may be that the user has completed making an entry to the user data store 60. When the user completes the entry (e.g., exits the calendar), the mobile device 22 may review the user data store 60 to see if the user entered data indicating a reference time 70. As another example, the trigger may be a request from the user that the mobile device 22 review the user data store 60 and identify data indicating the reference time 70 that may require the user to prepare media content items 34. In the case that no trigger is determined, the process 400 continues in the block 402. In the case that a trigger has occurred, the process 400 continues in a block 408.

In the block 406, the mobile device 22 accesses the user data store 60. The mobile device 22 reviews entries in the user data store 60, to determine whether and when the user will be travelling. For example, the mobile device 22 may be programmed to recognize key words such as flight, hotel, locations (such as other cities), itinerary, etc. in the user data store 60 that indicate whether and when the user is travelling. The process 400 continues in a block 408.

In the block 408, the mobile device 22 determines whether the reference time 70 is within a first predetermined time period 72. The first predetermined time period 72 is a time to remind the user to download media content items 34 prior to the impending reference time 70. In the case that the reference time 70 is within the first predetermined time period 72, the process 400 continues in a block 325. Otherwise, the process 400 continues in a block 410.

In the block 410, the mobile device 22 determines whether the mobile device 22 is authorized to notify the user that the reference time 70 is within the first predetermined time period 72. The mobile device 22 may have received authorization from the user as described above with reference to the process 300. Additionally or alternatively, the mobile device 22 may be authorized by default to notify the user of an impending reference time 70, based on installation of the video player 62, unless the user revokes the authorization, e.g., by input via the HMI 44. In the case that the mobile device 22 is authorized to notify the user that the reference time 70 is within the first predetermined time period 72, the process 400 continues in a block 412. Otherwise, the process 400 continues in the block 416.

In the block 412, the mobile device 22 collects programming data from the media device 20. The mobile device 22 collects data identifying a set of one or more media content items 34 that are available for downloading. The mobile device 22 may further collect data identifying a set of one or more media content items 34 that have been transcoded to generate format B media content items 34B. The mobile device 22 may further collect data indicating which media content items 34 are scheduled for recording between a current time and the pending reference time 70. The process 400 continues in a block 414.

In the block 414, the mobile device 22 notifies the user, for example via the HMI 44, that a reference time 70 is within the first predetermined time period 72, and reminds the user to download media content items 34. The user may, based on the notification, download media content items 34 from the media device 20 to the mobile device 22 and/or to the mobile storage unit 26 at a time convenient to the user.

In addition to notifying the user of an impending reference time 70, the mobile device 22 may request that the user identify media content items 34 that the user would like to transcode in preparation and/or download.

For example, the mobile device 22 may present a list of media content items 34, currently stored on the media device 20, or which the media device 20 is programmed to record. The user may select media content items 34 from the list of media content items 34 to be transcoded and/or downloaded. As one example, the HMI 44 may include a touchscreen display. The mobile device 22 may display the list of media content items 34 on the touchscreen display, and the user may select the media content items 34 for transcoding and/or downloading, by tapping on the names. The process 400 continues in a block 416.

In the block 416, the mobile device 22 determines whether the reference time 70 is within a second predetermined time period 74. The second predetermined time period 74 may be a time to prepare media content items 34 for downloading prior to the reference time 70. For example, the second predetermined time period 74 may be a time for the media device 20 to transcode format A media content items 34A to format B media content items 34B. The second predetermined time period 74 may be input by the user, or may be a default value from the video player 62.

In the case that the mobile device 22 determines that the reference time 70 is within the second predetermined time period 74, the process 400 continues in a block 418. Otherwise, the process 400 continues in a block 422.

In the block 418, the mobile device 22 determines if auto-transcoding is authorized. The user may have provided input authorizing auto-transcoding as described in reference to the process 300. Additionally or alternatively, the video player 62 may include default authorization for auto-transcoding. The mobile device 22 may transmit the authorization to the media device 20. Still further, the media device 20 may include default programming authorizing auto-transcoding upon receiving a request from the video player 62.

In the case that auto-transcoding is authorized, the process 400 continues in a block 420. Otherwise, the process continues in a block 422.

In the block 420, the mobile device 22 requests that the media device 20 transcodes format A media content items 34A to generate format B media content items 34B. The transcoding may include format A media content items 34A that the media device 20 has already (i.e., prior to the current execution of process 400) stored. Additionally or alternatively, the transcoding may include format A media content items 34A that the media device 20 stores following the current execution of process 400, but prior to the reference time 70.

The media device 20 can be programmed to transcode immediately format A media content items 34A that are already stored on the media device 20 and/or to transcode format A media content items 34A that are received after receiving the instruction and prior to the reference time 70. For example, the instruction from the mobile device 22 may include the reference time 70. The media device 20 may wait to transcode the format A media content items 34A until a set-up time. The set-up time may be a buffer period 80 before the reference time 70. Initially, the media device 20 may determine the set-up time equal the reference time 70 minus the buffer period 80. As described above, the buffer period 80 may be a time period input by the user, or it may be a default time period. The default buffer period 80 may be included in the video player 62, or included in the memory of the media device 20.

Further, the media device 20 may be programmed to transcode format A media content items 34A selected by the user. For example, as described in reference to the block 414, the mobile device 22 may request that the user select media content items 34, which may include format A media content items 34A, for transcoding. The process 400 continues in a block 334.

In the block 422, the mobile device 22 determines whether the reference time 70 is within a third predetermined time period 76. The third predetermined time period 76 may be a time for the mobile device 22 to download media content items 34 from the media device 20. The third predetermined time period 76 may be input by the user, or may be a default value from the video player 62. In the case that the reference time 70 is within the third predetermined time period 76, the process 400 continues in a block 424. Otherwise, the process 400 ends.

In the block 424, the mobile device 22 determines if auto-downloading is authorized. The user may have provided input authorizing auto-downloading, for example, in response to a request from the video player 62 as described in reference to process 300. Additionally or alternatively, the video player 62 may include default authorization for auto-downloading. The mobile device 22 may transmit the authorization for auto-downloading to the media device 20. Still further, the media device 20 may include default programming authorizing auto-downloading upon receiving a request from the video player 62.

In the case that auto-downloading is authorized, the process 400 continues in a block 426. Otherwise, the process 400 ends.

In the block 426, the mobile device 22 downloads media content items 34 from the media device 20 to the mobile device 22. The process 400 ends.

Figure 5:
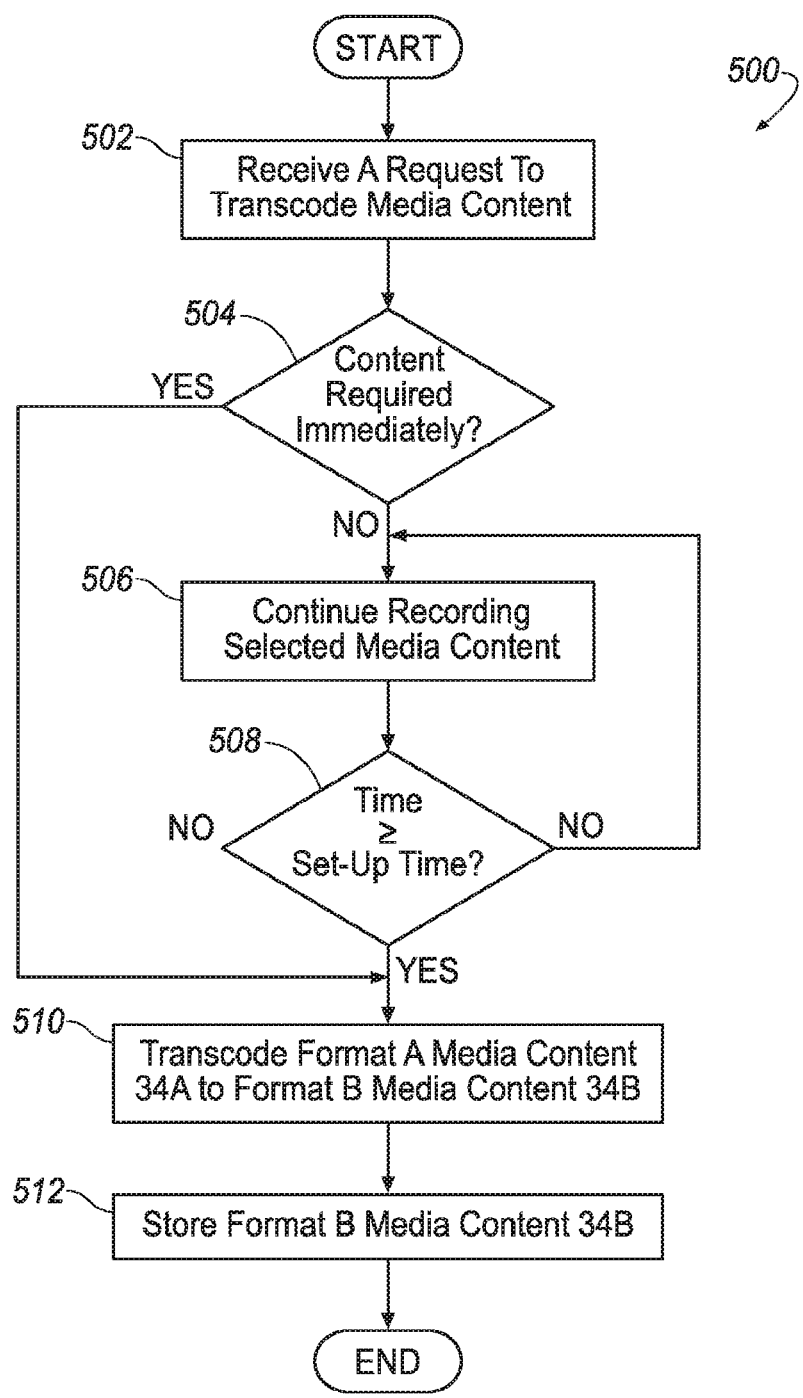
FIG. 5 is a diagram of an exemplary process for transcoding media content items.

FIG. 5 illustrates an exemplary process 500 for transcoding media content items by a media device 20 based on input from the mobile device 22 in the mobile device 22 or the mobile storage unit 26. The process 500 starts in a block 502.

In the block 502, the media device 20 in the media device 20 receives a message from the mobile device 22 or the mobile storage unit 26 to transcode media content items 34. The message may include a time for the media device 20 to perform the transcoding. For example, the message may specify that the media device 20 perform the transcoding immediately upon receipt of the instruction. As another example, the message may specify that the media device 20 perform the transcoding at a set-up time that occurs a buffer period 80 before the reference time 70.

Still further, the message may specify media content items 34 that the user selected for transcoding. The process 500 continues in a block 504.

In the block 504, the media device 20 determines, based on the message, whether the media device 20 is to transcode the media content items 34 immediately, or wait until a set-up time. In the case that the media content items 34 are to be transcoded immediately, the process 500 continues in a block 510. Otherwise, the process 500 continues in a block 506.

In the block 506, the media device 20 continues to record selected media content items 34. For example, as described above, the user may request that the media device 20 regularly record the ABC 6:30 News Report. The media device 20 may continue to record the ABC 6:30 News Report each evening. The process 500 continues in a block 508.

In the block 508, the media device 20 determines whether an actual time is greater than or equal to (i.e., at or after) a set-up time. The set-up time may be a time identified by the media device 20 as a time when the media device 20 is to initiate transcoding in order to have the media content items 34 available for downloading by the user. In the case that the actual time is greater than or equal to the set-up time, the process 500 continues in a block 510. Otherwise, the process 500 continues in a block 506.

In the block 510, the media device 20 in the media device 20 transcodes the media content items 34. The media device 20 may transcode all available format A media content items 34A to format B media content items 34B. Alternatively, the media device 20 may transcode only media content items 34 selected by the user. The process 500 continues in a block 512.

In the block 512, the media device 20 stores the transcoded format B media content items 34B in the memory 32 for future downloading to the mobile device 22 or mobile storage unit 26. The process 500 ends.

The process descriptions above are exemplary and are not intended to be limiting. Operations described as being performed by the media device 20 may be performed in part or in whole by the mobile device 22. Operations described as being performed by the mobile device 22 may be performed in part or in whole by the media device 20. Any of the operations may be performed as distributed programming divided between the media device 20 and mobile device 22 of the mobile device 22. Still further, one or more of the operations may be performed in part or in whole by the mobile storage unit 26.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

I claim:

1. A method for preparing mobile media content, comprising:
    identifying, based on user data, a reference time;
    determining that the identified reference time is within a predetermined time period;
    sending a media device a message including a time to initiate a transcoding of a media content item;
    recording the media content item with the media device after receiving the message and before the time;
    determining whether the identified reference time is within a set-up time corresponding to the time necessary to transcode the media content item;
    continue recording the media content item when the reference time is not within the set-up time; and
    stop recording and transcode the media content item when the reference time is within the set-up time.

2. The method of claim 1, wherein the user data is stored on a mobile device.

3. The method of claim 1, further comprising:
    determining that the reference time is within a predetermined time period; and
    sending a message to the user based on the determination.

4. The method stem of claim 1, further comprising:
    requesting from the media device a list of available media content items; and
    sending, via a human-machine interface, the list of available media content items.

5. The method of claim 4, further comprising:
    receiving an input from the user via the human-machine interface selecting the media content item from the list of available media content items.

6. The method of claim 1, further comprising displaying the media content item.

7. The method of claim 1, further comprising:
    requesting from the media device a list of media content items available for transcoding; and
    send, via a human-machine interface, the list of available media content items.

8. The method of claim 7, wherein the list of media content items available for transcoding includes a second media content item scheduled for recording after receiving the message, and before the time to initiate the transcoding.

9. A method, for a mobile device comprising a processor and a memory, the memory storing instructions executable by the processor, comprising:
    identifying, based on user data, a reference time;
    receiving a user request to download a media content item prior to the reference time;
    determining whether the identified reference time is within a set-up time corresponding to the time necessary to transcode the media content item;
    sending to a media device a message to initiate a transcoding of the media content item; and
    downloading the transcoded media content item from the media device.

10. The method of claim 9, further comprising:
    determining that the processor is authorized to access a user data store on a mobile device; and
    identifying the reference time based on data included in the user data store.

11. The method of claim 9, further comprising:
    determining that the reference time is within a predetermined time period; and
    sending a message to the user based on the determination.

12. The method of claim 9, further comprising:
    requesting from the media device a list of available media content items; and
    sending the list of available media content items to a mobile device.

13. The method of claim 12, further comprising:
    receiving an input from the user, via the mobile device, selecting the media content item from the list of available media content items.

* * * * *